July 18, 1950 T. H. BEARD ET AL 2,515,688

ADAPTER MECHANISM FOR DICTATING MACHINES

Filed Feb. 15, 1946 3 Sheets-Sheet 1

INVENTORS
Theodore H. Beard
BY George W. Cameron
Blair, Curtis + Hayward
ATTORNEYS

ADAPTER MECHANISM FOR DICTATING MACHINES

Filed Feb. 15, 1946 3 Sheets-Sheet 2

INVENTORS
Theodore H. Beard
BY George W. Cameron
Blair, Curtis + Hayward
ATTORNEYS

ADAPTER MECHANISM FOR DICTATING MACHINES

Filed Feb. 15, 1946 3 Sheets-Sheet 3

INVENTORS
Theodore H. Beard
BY George W. Cameron
Blair, Curtis & Hayward
ATTORNEYS Patented July 18, 1950 2,515,688

UNITED STATES PATENT OFFICE 2,515,688

ADAPTER MECHANISM FOR DICTATING MACHINES

Theodore H. Beard, Bridgeport, and George W. Cameron, Westport, Conn., assignors to Dictaphone Corporation, New York, N. Y., a corporation of New York Application February 15, 1946, Serial No. 647,852

13 Claims. (Cl. 74—242.15)

This invention relates to machines for recording and/or reproducing sound, and more particularly to adaptor mechanism for enabling belt record recording on standard cylindrical record dictating machines, whereby a machine of the type described may be used to record as usual on a cylindrical record blank, or, by the easy addition of suitable parts, be used to record on short endless flexible belt record blanks.

For an understanding of the general features of cylindrical record dictating machines of the type noted above to which the present invention might be applied, reference may be had to U. S. Patents 2,057,621, October 13, 1936, and 2,143,819, January 10, 1939.

Dictating machines designed for the effective use of endless flexible record loops or belts are known, such a one being fully disclosed in U. S. Patent 2,318,828, May 11, 1943. In the latter disclosure the record element consists of an endless loop of thin filmlike material such as acetate, which is capable of having formed thereon a record groove by an embossing or cutting stylus.

An object of the present invention is to provide simple, reliable and easily installed and operated adapting means for suitably supporting a loop record blank upon the same driving mandrel, as is used when recording on wax cylinders. A further object is to provide a simple and easily operable tensioning device for resiliently taking up the slack of the record belt, the latter means being easily adjustable to a collapsed position whereat its several parts are drawn together so that a loop record may readily be removed from or put upon the mandrel in operative relation to the recording or pickup unit, as the case may be. Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of the various possible embodiments of the invention, Fig. 1 is a front elevation of a dictating machine of the said type, with parts broken away and other parts omitted, disclosing an embodiment of the present invention;

Figure 1:
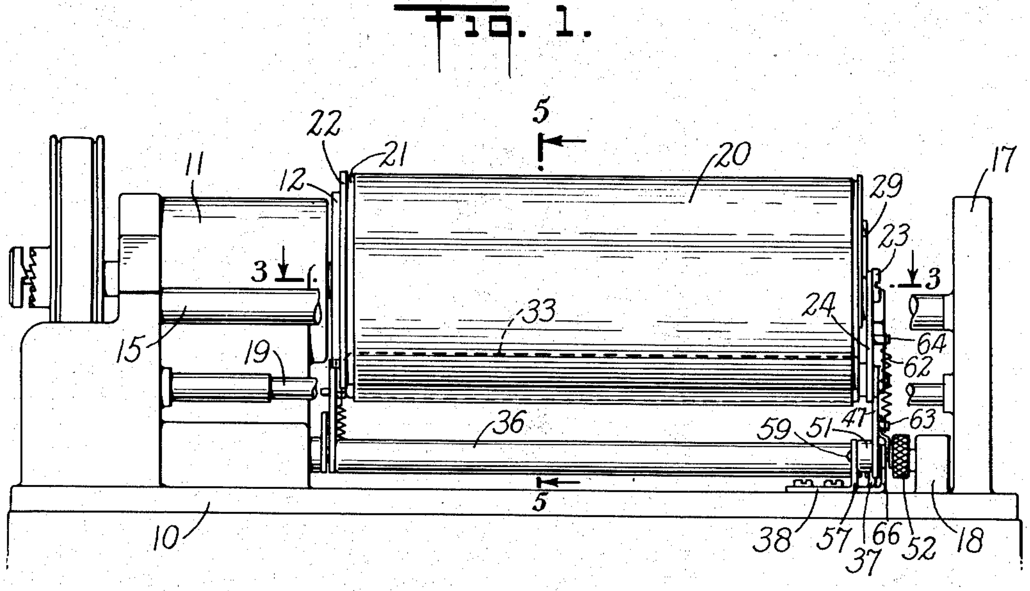
Figure 3:
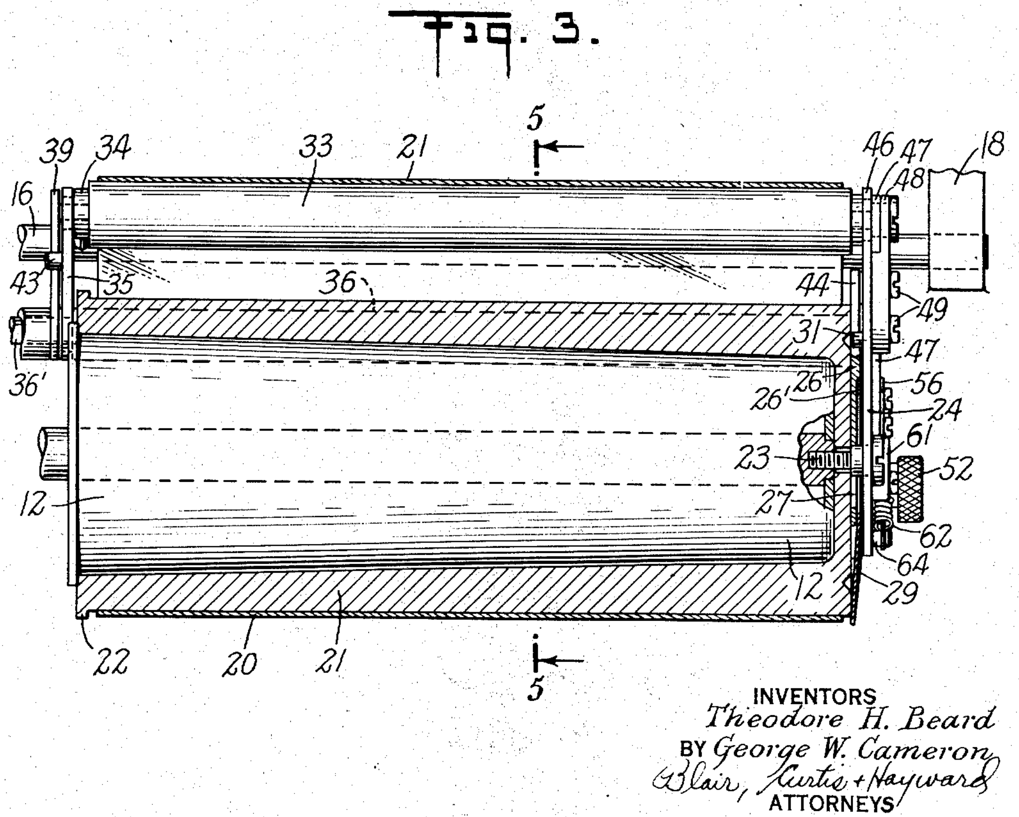
Fig. 3 is a top plan view of a portion of the apparatus shown in Fig. 1, on the same scale as Fig. 2.

Referring to the drawings, the phonograph shown is one normally employed for recording on wax cylinders, but, as described herein, suitable easily applied and detached parts have been incorporated in the structure to accomplish the objects above set forth, namely, to render the machine suitable for recording on short pliable loop record blanks.

The machine comprises a base 10 which, by means of a suitable standard 11 at the left side of the machine, rotatably supports a tapered mandrel 12. The mandrel 12 normally is used to support the well known wax record cylinder, not shown, commonly used to provide the record receiving surface in commercial phonographic machines. When so used, the mandrel provides a seat for the tapered inner surface of the record cylinder.

A recording or other translation unit 13 is supported upon a carriage 14 mounted to travel longitudinally of the machine on guide rods 15 and 16 supported at their left ends in the standard 11, and at their right ends respectively in the standards 17 and 18. The traverse of the carriage is accomplished by means of a rotating feed screw 19 which engages a feed nut, not shown, carried by the carriage. During recording, the record blank is engaged in a well known manner by a stylus, not shown, suitably mounted for vibration upon the recording unit 13. All of the parts thus far described and their functions and operation may correspond to the embodiment disclosed in the said U. S. Patent 2,057,621.

When held in engagement with the record blank, the stylus is vibrated to record on the record-receiving surface a helical groove having form characteristics corresponding to the sound wave received by the translating unit, as the carriage is moved longitudinally with respect to the rotating mandrel 12, in the manner usual with machines of this type.

The mandrel adapter or drive pulley and the belt tensioning mechanism comprising the features added to the known structure, will now be described.

A mandrel adapter 21 is provided to convert the tapered mandrel 12 into a flat pulley for driving and supporting the record belt 20. This adapter has a plain uncrowned cylindrical outer surface and interiorly is cone tapered to have a close sliding fit over the tapered surface of the standard mandrel 12. A flange or shroud 22 is provided at the inner or left end of the adapter or false mandrel to aid in positioning the record belt. The outer or right end of the mandrel adapter is closed and is provided with a central opening of a size to permit the free passage of a shoulder screw 23 which threads into the end of the standard mandrel. The shoulder of screw 23 abuts against the end surface of the adapter and retains the latter securely upon the standard mandrel 12. Mounted upon the shoulder of the screw 23 and directly inside of the head thereof, a plate 24 is mounted to have both oscillating and sliding movement upon the said screw, in a plane at right angles to the mandrel axis. This plate is slotted, as shown at 25, to provide for its transverse sliding movement. Behind the plate 24 and unattached thereto, there is rotatively mounted a shroud plate 26, which is also slotted, as shown at 27, for sliding movement relative to the plate 24 transversely of the mandrel axis. This shroud plate on the side adjacent the plate 24 is formed to provide a shallow channel $26^1$ adapted to hold the flat shank 28 of a thin spring steel shroud member 29. The shroud member may be spot welded to the surface of the shroud plate 26 or otherwise secured thereto. The shank 28 of the shroud member is also slotted out, as indicated at 30, so as to provide for movement of the shroud plate upon the screw 23.

Figures 2, 4, 5, 6:
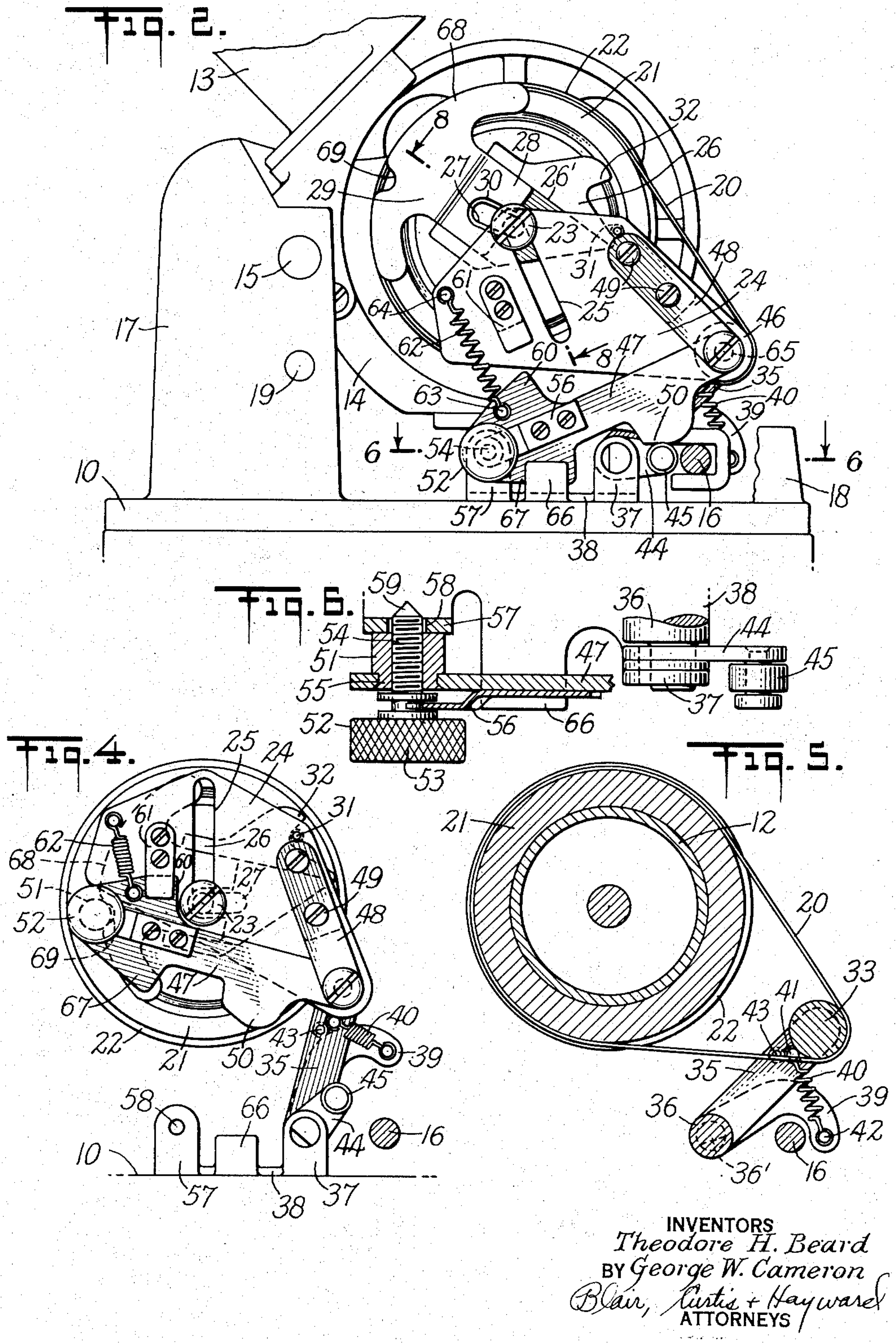
Fig. 2 is an enlarged right end elevation of the same.
Fig. 4 is an elevation similar to Fig. 2 showing the tensioning device in a collapsed position and with many machine parts which appear in Fig. 2 omitted entirely.
Fig. 5 is a cross-section taken on line 5—5 of Figs. 1 and 3, as indicated by the arrows, showing the supporting means for the inner end of the record belt idler pulley.
Fig. 6 is a cross-section taken on line 6—6 of Fig. 2, as indicated by the arrows.

In the position of the parts as shown in Fig. 2, the shroud member 29 extends out beyond the edge of the mandrel adapter and serves to protect the edge of the record belt 20 and prevent its accidental removal from said mandrel. When the parts are moved to the position shown in Fig. 4, this shroud member is drawn within the circumference of the mandrel and thus offers no interference to the removal of the belt from the mandrel. A pin 31 extending rearwardly from the plate 24 is adapted, in a third intermediate position of the parts, to engage a hooked portion 32 of the shroud plate 26 to cause said shroud plate both to swing and slide upon the screw 23 and thus effect change of position from that shown in Fig. 2 to that shown in Fig. 4.

Figure 7:
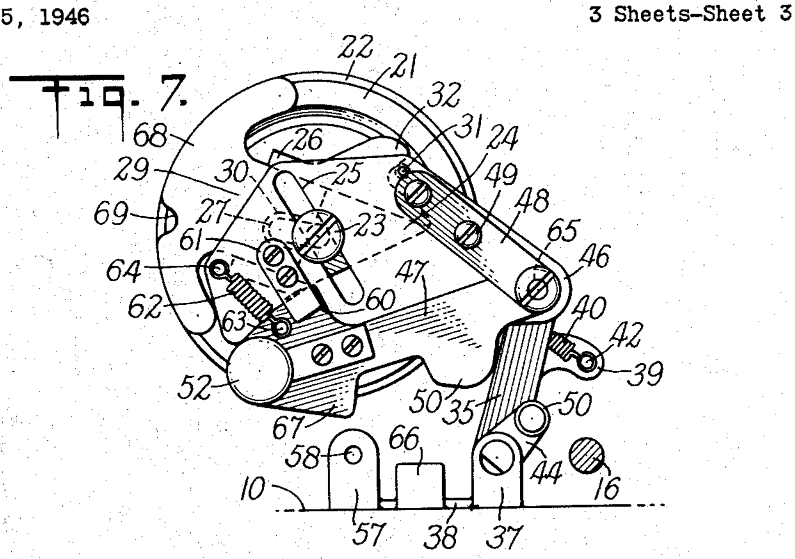
Fig. 7 is an end elevation showing the belt tensioning and releasing device in a functional position midway between Figs. 2 and 4.
Figure 8:
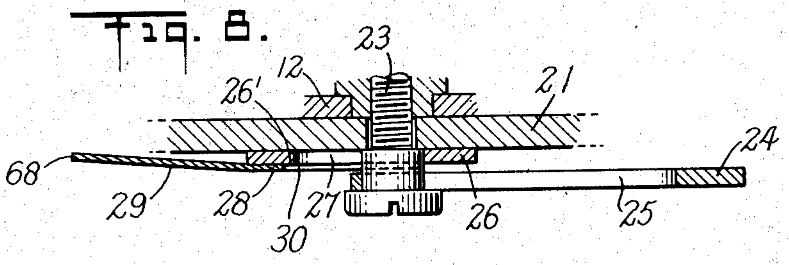
Fig. 8 is a cross-section taken on line 8—8 of Fig. 2.

Fig. 7 shows the parts in said intermediate position where the pin 31 has engaged the hook 32 but has not yet swung the shroud member about screw 23 to effect withdrawal of the shroud member to the position shown in Fig. 4.

Figure 9:
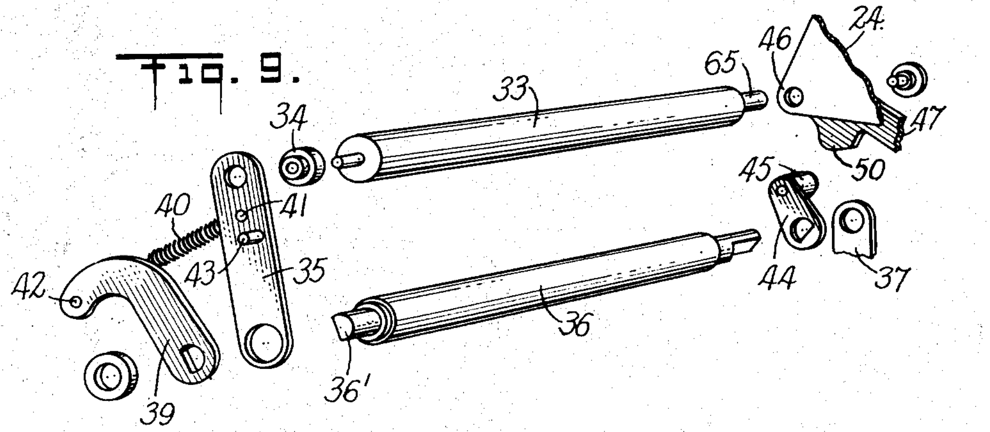
Fig. 9 is an exploded perspective view of certain elements of the tensioning device.

The tensioning member for the record belt comprises an idler pulley 33 which is substantially the same length as the mandrel pulley and is mounted rearwardly of and below the axis of the mandrel pulley to rotate in laterally adjustable bearings, and also to have slight end play in said bearings. The bearing 34 for the idler pulley at its inner or left end is mounted near the end of an arm 35, loosely mounted near the inner end of a rock shaft 36, which at that same end is pivoted in the standard 11, as by means of the slabbed bearing member $36^1$. The outer or right end of the rock shaft 36 is rotatably mounted in a bracket member 37 which extends upwardly from a bracket plate 38 secured to the upper surface of the machine base 10 in a suitable position near the outer end of the mandrel. Also mounted on the inner end of said rock shaft in non-rotative relation thereto, is a curved arm 39 which is angularly displaced with reference to the arm 35, as best shown in Figs. 5 and 9. These two arms are connected together by a tension spring 40 whose ends are attached to pins 41 and 42 projecting laterally from the respective arms. When free to act, the spring 40 tends to pull arms 35 and 39 into radial alignment. Any downward movement of arm 39 exerts through the spring 40 a downward pull upon the arm 35 which tends to bring the left end of the idler pulley 33 to a position to tighten the record belt at that end. However, by movement of the rock shaft, the arm 39 may be moved upwardly to release the tension on the arm 35 and pulley 33. A pin 43 projecting from the side of the arm 35 is adapted to engage the upper surface of the arm 39 and limit the movement of said arm with respect to the arm 35. This position is shown clearly in Fig. 4. Mounted upon the outer or right end of the rock shaft 36 is a short arm 44 carrying a roller 45 adapted to be engaged by a member, hereinafter described, to cause movement of the rock shaft for belt tensioning purposes.

Going back to the idler pulley 33, its outer or right end is provided with a journal 65 which has bearing in an extended portion 46 of the plate 24. The said journal is long enough to extend through the plate 24 and also through the rear end of a lever 47. This lever 47 pivots about the axis of the idler pulley and is held in proper juxtaposition to the plate 24 by means of a retainer plate 48 which is secured to the face of the plate 24 as by means of the screws 49. Slightly forward of its fulcrum, the lever 47 is provided with a downwardly extending cam member 50 which, as mentioned above, in a certain position of the parts engages the roller 45 of the rocker arm 44 and effects oscillation of the rock shaft. The lever 47 extends forwardly from its fulcrum to a point below and adjacent to the outer end of the mandrel where it is provided with a rearwardly extending boss 51, see Fig. 6. This boss is threadedly engaged by a tensioning device operating screw 52 having a knurled head 53 and a portion 54 which engages the threads of a hole extending through the boss 51. It will be understood that the lever 47 is apertured so that the screw passes through both lever and boss. As shown in the drawings, the hole in the lever 47 is made large enough to receive a projecting portion 55 of the boss 51 which may be suitably secured to the lever, as by riveting. Just beneath the knurled head 53, the screw 52 carries a pair of spaced collars between which extends the end of a bent leaf spring member 56. This member is rigidly secured to the lever arm 47 and tends to hold any adjustment of the operating screw 52.

A portion of the bracket plate 38 extends upwardly, as at 57, and is perforated, as at 58, to receive the tapered end 59 of the screw 52 which passes freely through the opening in said bracket member. Operation of this particular feature is obvious, for it is plain that in order to release the lever 47 for movement about its fulcrum, it is only necessary to grasp the knurled head 53 and unscrew until the end 59 comes clear of the hole 58 in the bracket member 57, after which movement the lever 47 may be manipulated by finger pressure upon the knurled head of the screw 52, and the parts moved to any desired position. Normally, as soon as the screw is released from engagement with the bracket member, the free end of the lever 47 is drawn upwardly toward the pivot center of the plate 24 until a shoulder 60 on the lever 47 engages a stop member 61 mounted upon the plate 24. This upward movement of the lever 47 is accomplished by means of a tension spring 62 which engages a pin 63 on the lever 47 and a pin 64 on the plate 24.

By reference to Figs. 2 and 4, it will be seen that an upstanding portion 66 of the bracket plate 38 serves as an abutment, engaging portion 67 of the lever 47 to hold the latter tightly in the position shown. Thus there is no possibility of the end 59 of the knurl screw 53 being unwantedly released from engagement with the bracket member 57.

It will also be seen, by reference to Fig. 2, that the shroud member 29 has an arcuate portion 68 extending beyond the periphery of the mandrel adapter and concentric therewith. As will be explained later, the edge of this arcuate portion 68, which is provided with a detent 69, serves in conjunction with the boss 51 of lever 47 as a cam to cause retraction of the shroud plate as the tensioning and releasing parts are collapsed for record removal.

Operation of the tensioning device for belt removal is as follows:

Assuming that the said device stands in the position shown in Fig. 2 and that the belt 20 is of a length to be properly tightened by reason of the fixed position of the right-hand journal of the idler pulley in this position and the resiliently held position of the left-hand journal of said pulley, which is held in the movable bearing 34, to remove the record belt the operator first turns out the screw 52 until its tapered end is clear of the bracket 57. This will free the lever 47 and plates 24 and 26 for further adjustment. Lever 47 will swing under the tension of spring 62 to the position shown in Fig. 7 with the lever shoulder 60 in contact with the plate abutment 61. Now by exerting pressure on the knurled head 53, the plate 24 can be slid upwardly on the screw 23 until the pin 31 makes contact with the hook 32 on shroud plate 26. Further upward movement of the parts by finger pressure will cause plate 24 and the shroud plate 26 to rotate counterclockwise about the screw 23 until, because of the inward tilting of the lower end of the arcuate portion of the shroud member 29, the boss 51 of lever 47 rides up on to the arcuate surface 68 of said shroud member 29, whereupon continued counterclockwise movement forces the shroud plate 26 radially inward, sliding on the screw 23 until the screw engages the left-hand end of the slot 27. When the parts have been completely collapsed, the lever abutment 51 will rest in the detent 69 holding all of the parts in the position shown in Fig. 4.

In this final position, the right-hand journal 65 of the idler pulley has been swung in close to the periphery of the mandrel adapter. The raising of the cam 50 with movement of the lever 47 having removed pressure from the rocker arm 44, the arms 35 and 39 will be drawn together by spring 40 until further movement is stopped by contact of the arm 39 with pin 43 on arm 35. During this recovery movement the rock shaft will turn slightly counterclockwise returning the rocker arm 44 to its raised position. The arm 35 being loose upon the rock shaft will thus be free to shift upwardly with the upward movement of the right-hand bearing of the idler pulley. In this way all tension is removed from the record belt which may be readily slipped by hand off of both the mandrel adapter and the idler pulley. After a new belt has been put in place upon the mandrel adapter, the lever 47 is pulled down all the way and its left end secured in fixed position by means of the knurled screw 54. This movement will return all of the parts to the position of Fig. 2 whereat the idler pulley will have been actuated by movement of lever 47 and clockwise movement of the rock shaft 36 resiliently to take up the slack in the record belt.

During the return clockwise movement of plate 24 the pin 31, riding downwardly on the camming surface 70 of shroud plate 26, will compel clockwise rotation and radial outward movement of the shroud plate until the position of Fig. 2 is reached, when the shroud member 29 will again be in position to function in relation to the right-hand edge of the record belt in case of any tendency of the said belt to shift in that direction.

From the foregoing it will be seen that this invention is one well adapted to attain all of the objects hereinbefore set forth in a simple manner.

While certain novel features of the invention have been disclosed and pointed out in the accompanying claims, it will be understood that various omissions, substitutions and variations may be made by those skilled in the art without departing from the spirit of the invention.

What is claimed is:

1. In apparatus of the character described, in combination, a horizontally disposed drive shaft, mounting means for an endless belt record blank having belt tensioning characteristics comprising, an upper pulley carried by said shaft and adapted to be driven thereby, a lower pulley rotatable about an adjustable axis movable into a tensioning position substantially parallel with said upper pulley, bearing means supporting one end of said lower pulley and laterally movable for causing displacement of said end of said pulley with respect to said upper pulley, bearing means for the other end of said lower pulley having freedom of movement to permit lateral displacement of the other end of said lower pulley, a manually operable lever for moving said one end bearing means into belt tensioning position and cooperative means operable in response to tensioning operation of said lever resiliently to effect movement of said other end bearing into belt tensioning position.

2. In apparatus of the character described, in combination, a horizontally disposed drive shaft, mounting means for an endless belt record blank having belt tensioning characteristics comprising, an upper pulley carried by said shaft and adapted to be driven thereby, a lower pulley rotatable about an adjustable axis movable into a tensioning position substantially parallel with said upper pulley, a lower pulley bearing support mounted to pivot upon and move laterally in relation to the axis of said upper pulley, a lever mounted to pivot about said lower pulley bearing and be moved to a position to tension said belt, releasable means adapted to hold said lever in belt tensioning position, and means movable in response to movement of said lever to said position to effect movement of the other end of said lower pulley to belt tensioning position.

3. In apparatus of the character described, in combination, a horizontally disposed drive shaft, mounting means for an endless belt record blank having belt tensioning characteristics comprising, an upper pulley carried by said shaft and adapted to be driven thereby, a lower pulley rotatable about an adjustable axis movable into a tensioning position substantially parallel with said upper pulley, a lower pulley bearing support mounted to pivot upon and move laterally in relation to the axis of said upper pulley, a lever mounted to pivot about said lower pulley bearing and be moved to a position to tension said belt, releasable means adapted to hold said lever in belt tensioning position, means movable in response to movement of said lever to said position to effect movement of the other end of said lower pulley to belt tensioning position, and resilient means tending to relax belt tension upon release of said holding means.

4. In apparatus of the character described, in combination, a horizontally disposed drive shaft, mounting means for an endless belt record element having belt tensioning characteristics comprising an upper pulley carried by said shaft and adapted to be driven rotatably thereby, an idler pulley rotatable about an axis movable into a tensioning position substantially parallel with said shaft, inner and outer bearings for said idler pulley located respectively in operative relation to the inner and outer ends of said shaft, manually operable means for moving the said outer bearing laterally away from said shaft to a belt tensioning position, and resilient means operatively associated with said manually operable means for responsively moving said inner bearing to a belt tensioning position.

5. In apparatus of the character described, in combination, a drive pulley adapted to support an endless belt record blank, an idler pulley shiftable laterally toward and away from said drive pulley axis to support and tension said belt, opposed bearings operatively supporting said idler pulley and independently shiftable with respect to the axis of said drive pulley, means to shift one of said bearings between a collapsed position for belt removal and a belt tensioning position, a shroud member movably mounted upon said drive pulley at the outer end thereof, and cooperative means associated with said shift means and said shroud member adapted to project said shroud member to an operative position beyond the periphery of said drive pulley with a shift of said shift means to tensioning position and to retract said shroud member to an inoperative position with shift of said shift means to belt removal position, and means to hold said shift means in tensioning position.

6. In apparatus of the character described, in combination, a drive pulley adapted to support an endless belt record blank, an idler pulley shiftable toward and away from said drive pulley axis to support and tension said belt, opposed bearings operatively supporting said idler pulley and independently shiftable with respect to the axis of said drive pulley, means to shift one of said bearings between a collapsed position for belt removal and a belt tensioning position, a shroud member movably mounted upon said drive pulley at the outer end thereof, and cooperative means associated with said shift means and said shroud member adapted to project said shroud member to an operative position beyond the periphery of said drive pulley with a shift of said shift means to tensioning position and to retract said shroud member to an inoperative position with shift of said shift means to belt removal position.

7. In apparatus of the character described, in combination, a drive pulley adapted to support an endless belt record blank, an idler pulley shiftable toward and away from said drive pulley axis to support and tension said belt, opposed bearings operatively supporting said idler pulley and independently shiftable with respect to the axis of said drive pulley, means to shift one of said bearings between a collapsed position for belt removal and a belt tensioning position, cooperative means associated with the other of said bearings and said shift means adapted to shift said other bearing to belt tensioning position in response to operation of said shift means to tensioning position, and means to hold said shift means in tensioning position.

8. In apparatus of the character described, in combination, a drive pulley adapted to support an endless belt record blank, an idler pulley shiftable toward and away from said drive pulley axis to support and tension said belt, opposed bearings operatively supporting said idler pulley and independently shiftable with respect to the axis of said drive pulley, means to shift one of said bearings between a collapsed position for belt removal and a belt tensioning position, and cooperative means associated with the other of said bearings and said shift means adapted to shift said other bearing to belt tensioning position in response to operation of said shift means to tensioning position.

9. In apparatus of the character described, in combination, a drive pulley adapted to support an endless belt record blank, an idler pulley shiftable toward and away from said drive pulley axis to support and tension said belt, opposed bearings operatively supporting said idler pulley and independently shiftable with respect to the axis of said drive pulley, means to shift one of said bearings between a collapsed position for belt removal and a belt tensioning position, and means to hold said shift means in tensioning position.

10. In apparatus of the character described, in combination, a drive pulley adapted to support an endless belt record blank, an idler pulley shiftable toward and away from said drive pulley axis to support and tension said belt, opposed bearings operatively supporting said idler pulley and independently shiftable with respect to the axis of said drive pulley, and means to shift one of said bearings between a collapsed position for belt removal and a belt tensioning position.

11. In apparatus of the character described, in combination, a flat drive pulley having a projecting annular flange at its inner end and adapted to support and drive an endless belt record blank, an idler pulley shiftable toward and away from said drive pulley axis to support and tension said belt, opposed bearings operatively supporting said idler pulley and independently shiftable with respect to the axis of said drive pulley, and means to shift one of said bearings between a collapsed position for belt removal and a belt tensioning position.

12. In apparatus of the character described, in combination, a flat drive pulley having a projecting annular flange at its inner end and adapted to support and drive an endless belt record blank, an idler pulley shiftable toward and away from said drive pulley axis to support and tension said belt, opposed bearings operatively supporting said idler pulley and independently shiftable with respect to the axis of said drive pulley, means to shift one of said bearings between a collapsed position for belt removal and a belt tensioning position, a shroud member movably mounted upon said drive pulley at the outer end thereof, and cooperative means associated with said shift means and said shroud member adapted to project said shroud member to an operative position beyond the periphery of said drive pulley with a shift of said shift means to tensioning position and to retract said shroud member to an inoperative position with shift of said shift means to belt removal position.

13. In apparatus of the character described, in combination, a base, a drive pulley rotatively mounted on said base, driving means for said drive pulley mounted on said base, a rock-shaft mounted on said base parallel to said drive pulley and substantially coextensive in length with said pulley, an idler pulley mounted to assume a position parallel to said drive pulley for tensioning a record belt supported by said pulleys or a collapsed oblique position with its outer end closely adjacent the periphery of said drive pulley for facilitating removal of said belt, mounting means for said idler pulley comprising a tight and a loose arm mounted upon an end of said rock-shaft adjacent the inner end of said drive pulley, a tension spring connecting said arms tending to draw said arms into a position of mutual alignment, a bearing for rotatively mounting the inner end of said idler pulley carried by said loose arm, a rock-arm tightly secured to said rock-shaft at the other end thereof, platelike means for supporting a bearing for the outer end of said idler pulley slidably and rotatably mounted coaxially of said drive pulley at its outer end, and means for positively shifting said platelike means and simultaneously actuating said rock-arm to effect movement of said rock-shaft and thus move both ends of said idler pulley into tensioning position.

THEODORE H. BEARD.
GEO. W. CAMERON.

REFERENCES CITED

The following references are of record in the file of this patent:

UNITED STATES PATENTS

| Number | Name | Date |
|---|---|---|
| 939,692 | Holman | Nov. 9, 1909 |
| 2,257,796 | Heineke | Oct. 7, 1941 |
| 2,273,916 | Westerkamp | Feb. 24, 1942 |
| 2,335,586 | De Sart | Nov. 30, 1943 |
| 2,338,414 | De Sart et al. | Jan. 4, 1944 |
| 2,341,468 | Neumann | Feb. 8, 1944 |